Nov. 7, 1950     E. J. FARKAS     2,528,584
AUTOMATIC TRANSMISSION
Filed Aug. 22, 1945     4 Sheets-Sheet 1

E. J. Farkas
INVENTOR.

Nov. 7, 1950 E. J. FARKAS 2,528,584
AUTOMATIC TRANSMISSION
Filed Aug. 22, 1945 4 Sheets-Sheet 2

E. J. Farkas
INVENTOR.
BY
Attorneys

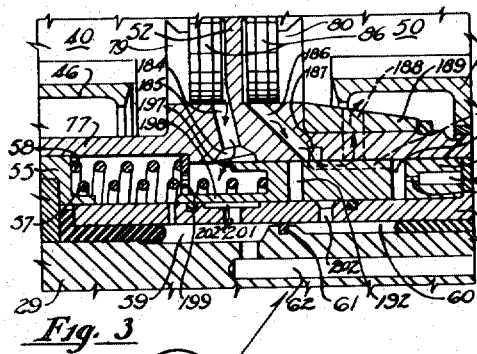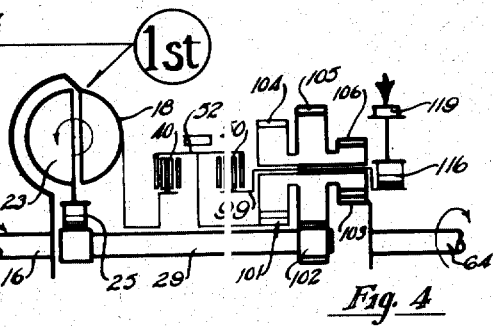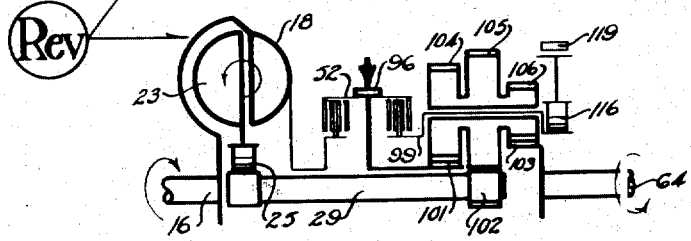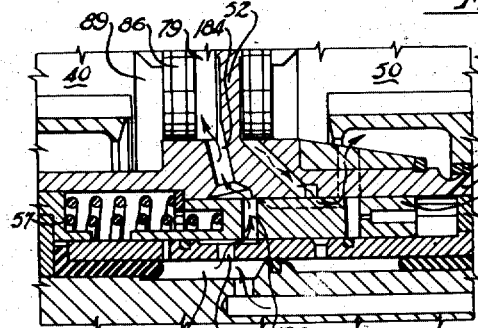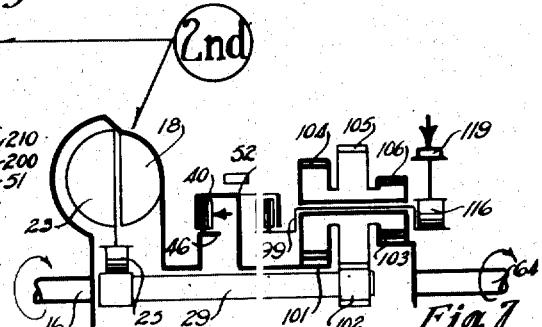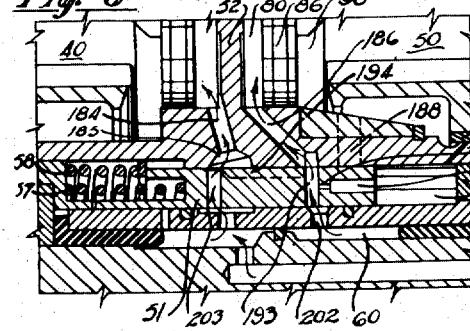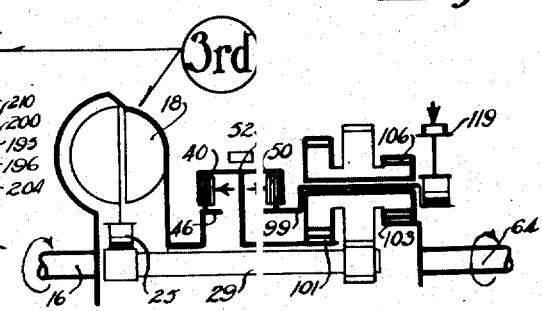

Nov. 7, 1950 E. J. FARKAS 2,528,584
AUTOMATIC TRANSMISSION

Filed Aug. 22, 1945 4 Sheets-Sheet 4

E. J. Farkas
INVENTOR.

BY Elwyn C. McRae
R. G. Harris
Attorneys

Patented Nov. 7, 1950

2,528,584

UNITED STATES PATENT OFFICE 2,528,584

AUTOMATIC TRANSMISSION

Eugene J. Farkas, Detroit, Mich., assignor to Ford Motor Company, Dearborn, Mich., a corporation of Delaware Application August 22, 1945, Serial No. 611,975

20 Claims. (Cl. 74—732)

This invention relates to a transmission; and, more particularly, to that type of transmission in which mechanical and fluid power transmitting means are combined and automatically operated to obtain maixmum efficiency and smoothness in torque conversion in motor vehicles.

An object of this invention is to provide a mechanical power path for the higher forward speeds, while incorporating a fluid power element in the low and reverse speeds. Another object is to apply complete automatic operating means to a transmission of the combined hydraulic planetary gear type to obtain smooth transition between the successive stages of operation. Still another object is to devise an automatic, hydraulically operated control means particularly applicable to such transmissions and forming an internally disposed part thereof; and which is inherently so flexible and responsive in operation that the transition between stages will be effected quietly and smoothly whether the vehicle speed is increasing or decreasing and which will effect the precise operation called for under the particular circumstances.

One of the principal advantages of the present construction is that the operation of the hydraulic coupling is limited to the lower speeds at which the coupler efficiency is not too important a factor and that in the upper ranges the drive is directly through a more or less conventional mechanical transmission. It follows from this that automatic means are provided to render the hydraulic coupling inoperative under advanced speed conditions and to return it to operation when the speed decreases to a point at which such operation is again feasible. These operations are conducted automatically by the control mechanism itself and this control mechanism requires no exterior control during either advancing or declining speeds to be completely effective. Indeed, the only manual control required is the selection of the direction of operation. In addition, the transmission is immediately responsive to demands for increased acceleration, or the automatic feature may be overridden when a higher torque is required for a longer period. In order to adapt a transmission of this type to current automatic practice, it is essential that the component be so arranged so as to conform to the limited spaces—both longitudinal and transverse—now available. The advantage of the present transmission is that the components are so arranged that the complete unit requires no more room and, indeed, is actually nterchangeable with the present slide gear tra ismissions used in conventional practice.

Due to the spectific operating or control means relied upon, the shifting between successive stages is completely automatic and extremely smooth. This is true whether the transitions are taking place through increasing or decreasing speeds. Further, the operation is so flexible that the transmission will respond readily to any demands placed upon it in ordinary driving and, thus, the vehicle responds instantly to demands for increased speed and will readapt itself to ordinary operating conditions when these extreme demands are met. In addition, the driving members are so arranged that the loads on those components, which are utilized during the greater period of the vehicle's operation, are so distributed as to reduce the wear thereof to a minimum. Finally, automatically operable anti-creeping means is incorporated to obviate a very dangerous condition met with in the majority of fluid-coupled drives.

With these and other considerations in view, the invention consists of the apparatus described in this specification, claimed in the claims and illustrated in the accompanying drawings, in which:

Figures 3, 6 and 8 are longitudinal views, on a greatly enlarged scale, of a portion of the apparatus shown on Figure 1, and more specifically illustrating the operation of the hydraulic clutch operating means for First and Reverse, Second and Third speeds, respectively.

Figures 4, 5, 7 and 9 are schematic drawings of the transmission showing the power transmission through the mechanism for First, Reverse, Second and Third speeds, respectively.

Figure 1:
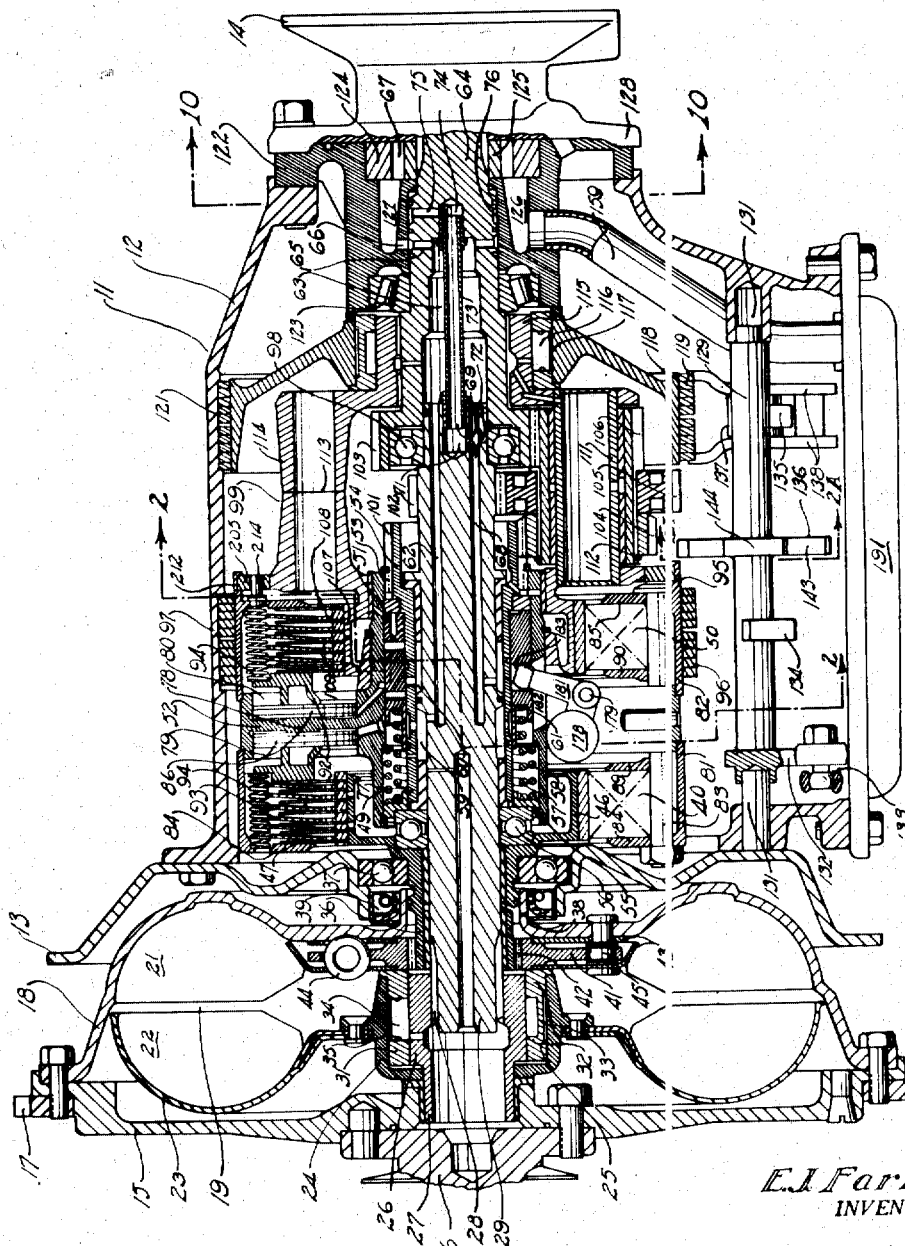
Figure 1 is a longitudinal vertical section taken through the transmission of this invention.

Referring to Figure 1, the reference character 11 indicates generally a transmission having a housing 12, with a forward flange 13 through which it may be attached to an engine and an universal joint housing 14 at its rear end to accommodate the connection to the rear axle drive means of any of the usual types. At the forward end, the flywheel 15 is bolted and doweled to engine crankshaft 16 and the starter ring gear 17 is mounted in the usual manner. Also, secured to the rear face of the flywheel 15 adjacent its periphery is the impeller housing 18 of a Fottinger type fluid coupling 19. Radially spaced vanes 21 are mounted in the housing 18 and co-operating vanes 22 are secured on the runner housing 23. This last housing is mounted on a hub 24 which is journaled through an overrunning clutch 25 on the main shaft extension 26, having its forward end piloted in the flywheel at 27 and splined at 28 at its rear end to the main shaft 29. The particular overrunning clutch shown as 25 is more fully described in a copending application filed herewith, entitled "Overrunning Clutch," Serial No. 611,974, in the names of Eugene J. Farkas and Joseph W. Rackle. It suffices here to note that it includes a race 31 having spaced rims 32 joined by separators 33, carrying sprags 34. These are urged into driving engagement between the inner surface of the hub 24 and the outer concentric surface of the shaft extension 26 by a simple single coil spring received in the notches 35.

A sleeve 36 is rotatably mounted on the main shaft 29 and externally journaled by a bearing 37 in the forward flange 13. The central hub 38 of the housing 18 is piloted on the intermediate portion of the sleeve 36, and an oil seal 39 is interposed between the central portion of the flange 13 and the external surface of the central hub 38. The impeller housing 18 is drivingly connected to the forward end of the sleeve 36 through a cushioned clutch plate construction of conventional design of which the driven hub 41 is splined at 42 to the sleeve 36, and the driving plates 43 carry a cushion spring 44 and a driving pin 45. The sleeve 36 terminates rearwardly in a splined drum 46 of enlarged diameter, carrying a series of clutch driving discs 47 (this clutch mechanism referred to generally is the second speed clutch 40, as well as that of the third speed clutch 50 later described, are shown in detail only in the upper half of Figure 1, to avoid unnecessary duplication).

Continuing rearwardly along the main shaft 29, the principal clutch assembly is shown (the operating portion of this assembly is shown in much enlarged scale in Figures 3, 6, and 8). Essentially, the assembly consists of an inner clutch sleeve 49 rotatably mounted on the main shaft 29, an intermediate concentrically arranged longitudinally slidable sleeve valve 51 and the outer concentrically arranged clutch carrier or power transmitting member 52 splined at 53 to the rearward extension 54 of the clutch sleeve 49. The sleeve valve 51 is normally urged rearwardly by two coil springs bearing against the retainer ring 55 cooperating with the longitudinal thrust bearing 56. The primary spring 57 is alone operative on the sleeve valve during the initial stages of its travel, while the secondary spring 58 also comes into operation during the remainder of its travel. It will be noted that there are several co-operating ports in the clutch carrier 52, sleeve valve 51 and clutch sleeve 49. The description of their location and function, and of the operation of the springs referred to above will be deferred until later in this specification where the operation of the device is considered in detail. It will be sufficient to note here that two circumferential chambers separated by the ring 61 are formed between the clutch sleeve 49 and the main shaft 29 and these are designated as the second speed clutch supply 59 and third speed clutch supply 60, respectively. A second speed oil duct 62 leads rearwardly through the main shaft 29 to a central cavity 63 in the main driven shaft 64. The cavity 63, in turn, communicates through the lead 65 with the second speed delivery port 66 of the oil pressure pump 67. On the other hand, the third speed clutch supply 60 communicates through the third speed oil duct 68 and the radial lead 69 with a bore 71 at the rear end of the main shaft 29. The rear end of the duct 68 and the outer end of the lead 69 are closed by plugs 72. The bore 71 is connected by a sleeve 73 extending through the cavity 63 to a similar bore 74 in the main driven shaft 64. A radial lead 75 extends from the bore 74 to a circumferential channel 76 through which communication is eventually established with the third speed delivery port of the pressure pump 67.

The clutch carrier 52 has a hub 77 of considerable length and a disc-like body 78 in which are formed a number (in this case twelve) of opposed clutch operating cylinders designated as 79 for the second speed clutch 40, and 80 for the third speed clutch 50. The carrier proper is completed by a forward shell 81 and a rearward shell 82 mounted on the periphery of the body 78 and all three elements are secured together by the bolts 83. The shells 81 and 82 have inwardly extending flanges 84 and 85, respectively, which serve as abutments for the clutch discs. Clutch operating pistons 86 are mounted in each of the cylinders 79 or 80 on both sides of the body 78 and are responsive to oil pressure supplied through leads extending through the clutch hub 77, the exact location and operation of these being described later. The clutch operating rings 89 and 90 for second and third speeds, respectively, are mounted forwardly and rearwardly of the body 78, respectively, and have extensions 92 engaging the several pistons 86. A plurality of clutch driven discs 93 having a dished shape are interleaved with the clutch driving discs 47 and are restrained from rotation relative the clutch carrier 52 by the bolts 83. A coil spring 94 normally urges the clutch operating ring 89 toward the carrier body 78 disengaging the discs 93 and 47. A brake drum 95 is formed on the external surface of the rearward shell 82 and co-operates with the reverse brake band 96, received in the recess 97 in the housing 12. These brakes (see Figure 2) are of the form shown generally in Patent 2,020,404, comprising a pair of metal bands of rectangular cross section having several wraps around the drum. The adjacent inner ends have eyes 100 and are anchored by longitudinal anchor pins 87 in the anchor housings 88. The outer ends carry the lugs 141 through which the bands are operated.

Continuing rearwardly, the main driven shaft 64 is piloted at its forward end on the bearing 98 on the rear end of the main shaft 29. This particular section of the housing encloses the planetary gearing system comprising a planet carrier 99; the sun pinions 101 (formed on the rearward extension 54 of the clutch sleeve 49), 102 (formed integrally with the main shaft 29) and 103 (formed on the forward end of the main driven shaft 64); and three sets of planet pinion clusters each comprising three pinions 104, 105 and 106, rotatably mounted in the planet carrier 99 and in constant mesh with their respective sun pinions. The carrier 99 has a splined clutch drum 107 extending forwardly therefrom within the clutch carrier 52 and carrying a number of clutch driven discs 108 which co-operate with a number of clutch driving discs 109 secured to the carrier 52. This clutch, designated as the third speed clutch 50, is operated, as was the second speed clutch 40, through the pistons 86 in the cylinders 88, the clutch operating ring 90, and the spring 94.

The planetary clusters referred to above are rotatably mounted on the hollow shafts 111 secured in the carrier 99. The planet pinion 106 runs the entire length of the cluster and the other two planet pinions 104 and 105 are keyed to it and held in position by the retainer 112, thus giving a substantially integral construction. The carrier 99 is made in two parts, cut transversely of the principal axis and welded together at 113 on the struts 114. It extends rearwardly to form the inner race 115 supporting the forward speeds overrunning clutch 116, whose outer race 117 is a part of the forward speeds brake drum 118. The brake band 119 in the recess 121 and the overrunning clutch 116 are selectively operable to prevent reverse movement of the carrier 99. A pump housing 122 is secured to the rear end of the housing 12 and supports the main driven shaft 64 in the bearing 123. The pump housing 122 encloses an impeller having an outer driven member 124 and an inner driving member 125, together with the suction intake 126 and the delivery chamber 127. The pump housing is completed by the cover plate 128, which also supports the universal joint housing 14.

Figure 2:
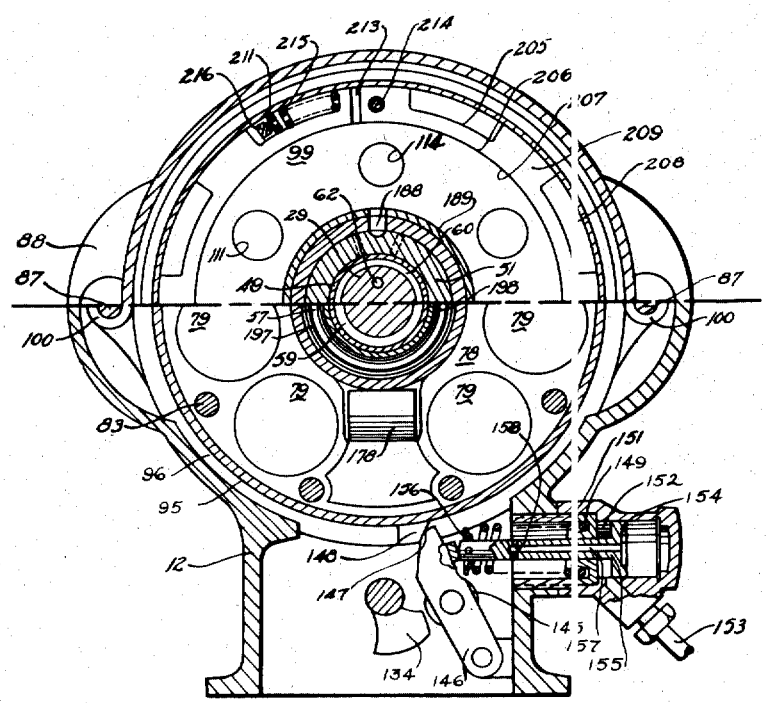
Figure 2 is a transverse vertical section taken as indicated on the line 2—2 of Figure 1.
Figure 2A:
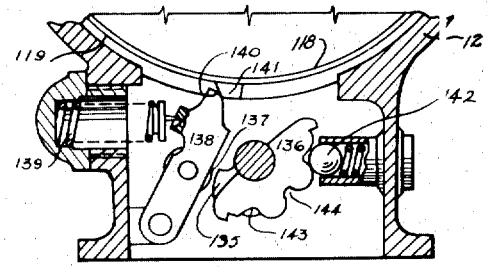
Figure 2A is a corresponding view taken as indicated by the line 2A—2A of Figure 1.

Reference is now made to the lower portion of Figure 1 in which the manually operated control is shown. This comprises a rock shaft 129 journaled on the housing 12 at 131 having an operating arm 132 at its forward end connected through operating linkage 133 (not shown in detail, but including connections leading to an operating lever preferably placed adjacent the steering wheel of the vehicle in which the transmission is installed), two brake operating cams 134 and 135 and a ratchet control 136. Figures 2 and 2A show the precise structural relations of these elements. In Figure 2, the reverse brake operating cam 134 is shown in the position occupied in reverse operation, during which the band 96 engages the drum 95; but adapted, on rotation counterclockwise, to engage the roller 145 on the pivoted arm 146. This arm also has a cam surface 147 bearing against the lug 148 on the band 96. The arm 146 is urged inwardly by a spring 149 tending to engage the brake; but the spring housing 151 includes an hydraulic chamber 152, which is connected through the duct 153 directly to the delivery chamber 127 of the oil pressure pump 67. A piston 154 is mounted in the cylinder 152 and has a connecting rod 155 to which is attached the spring retainer 156. The rod 155 has a hollow stem 157 and bleeds 158 through which fluid leaking behind the piston 154 may drain to the interior of the housing. The purpose of this construction is to prevent engagement of reverse while the vehicle is moving forwardly. While such movement occurs, the cam 134 is in its rotated position and the arm 146 is forced to the right against the urging of the spring 149, releasing the brake band 96. This also moves the piston 154 to the right and the chamber 152 fills with oil. Since the oil pump is driven by the final driven shaft 64, so long as that shaft rotates in the forward direction, the chamber 152 is filled with oil and the brake 96 cannot be engaged even if the cam 134 is moved to the position shown in Figure 2. Before the reverse drive can be instituted, the forward movement of the vehicle must be stopped.

Figure 2A shows the operating mechanism for the forward speeds brake 119, which again includes a cam 135 shown in the position occupied in forward operation during which the band 119 engages the drum 118; but adapted, on clockwise rotation, to engage the roller 137 on the pivoted arm 138 to release the brake. The arm is loaded by the spring 139 and has a cam surface 140 at its upper extremity engaging the lugs 141 welded to the outer ends of the band 119. The ratchet 136 is shown in the same view (of course, in forward speed position) and co-operates with the spring-loaded selector 142 by which the shaft 129 may also be secured in either the reverse or neutral notches 143 and 144. While elements 138 and 139 have been described in the singular, each (as will be apparent from Figure 1) comprises two separate arms straddle mounted to engage each end of the respective brake band and to support the respective roller.

Figure 10:
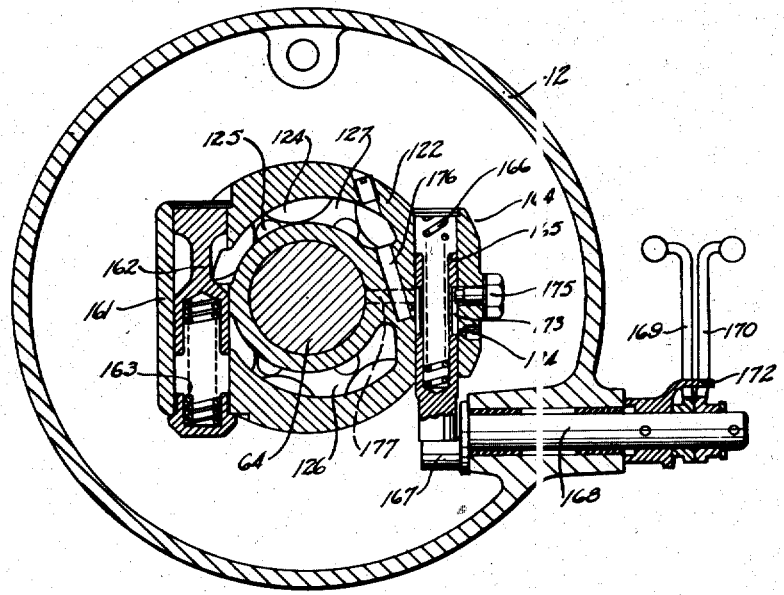
Figure 10 is a transverse section of the view taken as indicated by the line 10—10 of Figure 1.
Figure 11:
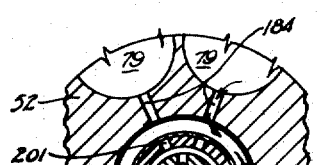
Figures 11 to 16 are transverse sections taken through the clutch operating means at various section lines to show the hydraulic connections existing at successive stages corresponding to those shown in Figures 3, 6 and 8.

Referring to Figure 10, and the extreme right-hand portion of Figure 1, the pressure pump and its control mechanism is shown. The pump shown is a well-known type (though any conventional gear pump may be used) and is supplied with oil from the bottom of the housing by the pipe 159 leading to the suction intake 126 and delivers it under pressure to the chamber 127. A pressure relief valve 161 mounted in one side of the housing 122, comprises a plunger 162 normally urged upwardly by the spring 163. When the oil pressure in the delivery chamber 127 reaches a predetermined maximum, the plunger 162 is depressed, permitting flow from the chamber 127 directly to the suction side 126 of the pump. The housing 122 also includes an accelerating valve 164, having a plunger 165 normally urged downwardly by the spring 166. The lower end of the plunger 165 engages an eccentric cam 167 on the control rod 168. Two control arms 169 and 170 are rotatably mounted on the control rod 168 and are connected to the foot accelerator control and a manual accelerator control, respectively. A finger 172 is pinned to the control rod 168 and is so arranged that independent movement of either arm 169 or 170 will be transmitted to the cam 167. The plunger 165 has a section 173 of reduced diameter intermediate its ends and in the plunger's lowermost position, the section 173 communicates with a metering bleed 174, whose function will be described later, opening to the transmission housing. The ultimate range of travel of the plunger 165 is regulated by the bolt 175 engaging the upper and lower boundaries of this section 173.

In ordinary operation at third speed, oil under pressure to operate the second speed clutch is delivered from the delivery chamber 127 through the second speed delivery port 66 and the lead 65 (see Figure 1). Oil for operation of the third speed clutch passes through the lead 176 from chamber 127 to the section 173 and thence through the offset lead 177 (indicated in dotted line in Figure 10) whose longitudinal position corresponds with the circumferential channel 76 on the main driver shaft 64, the radial lead 75 and the sleeve 73. When an immediate acceleration is desired necessitating the use of the second speed gear ratio, the acceleration valve 165 may be operated automatically through the complete depression of the accelerator pedal; or the transmission may be kept in the second speed ratio through a manual control: in either case, the plunger 165 is raised in response to the resultant rotation of the eccentric cam 167. This will shut off the communication between the lead 176 to the section 173, thereby reducing the pressure in the third speed clutch supply. This action is effective only when the control (whether pedal or manual) is substantially completely depressed in response to the demand for increased speed, or other conditions requiring use of the second speed gear ratio. If, on the other hand, a more moderate acceleration is desired, slow but continued depression of the accelerator pedal—although the plunger is displaced—does not affect the operation of the third speed clutch and the transmission does not revert to the second speed ratio. This is due to the high centrifugal force built up in the clutch carrier, which keeps the fluid in the clutch operating cylinders themselves under sufficient pressure to maintain the clutch engagement despite the fact that the pump may no longer be supplying fluid to them. This will be explained more fully when the operation of the control device is considered in detail.

Reference is now made to the central portion of Figure 1 and the lower part of Figure 2. It will be noted that centrifugally operated weights 178 are arranged between each of the pairs of cylinders 79 or 80, and are pivoted at 179 on the carrier 52. Each weight has a crank arm 181 extending through a slot 182 in the carrier hub 77 and operatively engaging a recess 183 in a sleeve valve 51. It will be apparent that as the carrier 52 rotates at higher speeds, the resultant centrifugal force acting upon the weights 178 will cause the sleeve valve 51 to move to the left against the resistance of the primary and secondary springs 57 and 58. The amplitude of this movement is dependent upon the rotational speed of the carrier and the respective resistances of the springs; and it will be observed that as this movement of the sleeve valve takes place, successive ports are brought into alignment with or closed off from co-operating ports in the hub 77 and the clutch sleeve 49 to establish differing hydraulic circuits.

The exact function and operation of this particular mechanism can best be seen in Figures 3 to 9 and 11 to 16, inclusive. Figures 3, 6, and 8 show the longitudinal arrangement of a representative portion of the control apparatus under various speed and directional conditions, and most of the constituent elements have been identified and described in relation to Figure 1. Figures 11 to 16 show the successive transverse arrangements under similar conditions. Generally, it may be noted that the clutch carrier hub 77, the sleeve valve 51 and the clutch sleeve 49 each have at least two hydraulic leads for each of the cylinders and these leads, due to the relative longitudinal movement of these concentric parts, form various channels to and from their respective cylinders. Thus, the hub 77 has a second speed conduit 184 for each cylinder having a flared lower opening 185. The hub also has a third speed conduit 186 for each cylinder which terminates in a transversely extending oil groove 187. In addition, it carries a relief conduit 188 for each pair of cylinders midway between the other conduits supplying each of the cylinders in the respective pair and leading from the bore of the hub 77 through the ring 189 and permitting oil to waste to the interior of the housing and thence to the sump 191.

The sleeve valve 51 also has a second speed conduit 192 and a third speed conduit 193 for each cylinder, arranged in the same axial planes as the conduits 184 and 186 which are, of course, the same axial planes as those of each of the individual cylinders 79. In addition, a longitudinally extending oil groove 194 (shown in dotted line in Figure 3) is located on the outer circumference of the sleeve valve 51, midway between each of the pairs of conduits. These are thus aligned with the respective relief conduits 188 and intersect the transverse oil grooves 187 referred to above. In addition, the third speed conduit 193 has a small metering orifice 195, leading to a duct 196 which extends to the rear end of the sleeve valve 51. This orifice operates in conjunction with the bleed 174 in the accelerating valve 164 previously described. The orifice 195 permits oil to flow behind the sleeve valve as it moves towards the left, and keeps the third speed clutch engaged during merely minor speed variations. However, this must be overruled at the lowest speeds and for idling when the accelerator is released completely and this is accomplished by the bleed 174 which permits a drop in third speed oil pressure at the pump and in the chamber 204 behind the sleeve valve 51, so that the sleeve valve 51 is forced to the right by the operation of the springs 57 and 58 and the oil is then forced out of the chamber 204 through the conduit 200 past the bushing 210 which has a slight clearance (see Figure 6). The sleeve valve 51 has an auxiliary outer sleeve 197 and a somewhat longer auxiliary inner sleeve 198. The latter restricts the travel of the sleeve valve forwardly while the outer sleeve 197, about midway of the travel of the sleeve valve, bears against the retaining ring 199 of the secondary spring 58. Further movement of the sleeve valve 51 forwardly is then resisted by both springs 57 and 58.

The clutch sleeve 49 also has second and third speed conduits 201 and 202 axially aligned with the centers of each of the cylinders and corresponding to the axial planes of the similar conduits in the sleeve valve 51 and hub 77. Again, the second speed conduits 201 are provided with annularly extending grooves 203 corresponding to the similar construction at 185. As pointed out above, the second and third speed clutch supplies 59 and 60 are separated by the ring 61, thus localizing the supplies of oil for the independent operation of the second speed and third speed clutches.

Reference is now made to Figures 3 through 9 and 11 through 16 as indicating, first, the relative positions of the control apparatus; and, second, in a diagrammatic fashion, the power flow through the transmission from the engine to the driven shaft under each condition of operation.

FIRST SPEED

Figures 3, 4, 11, 13 and 15

Figure 13:
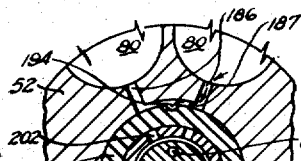
Figure 15:
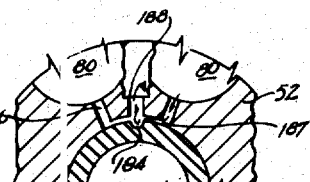

In Figure 3, the control mechanism is shown at first speed operation during which the rotational speed of the clutch carrier is low enough so that the centrifugal weights 178 are not perceptibly displaced. As a consequence, the sleeve valve 51 remains substantially in its most rearward position. Under these conditions, neither the second or third speed clutches 40 or 50 is operated, as the auxiliary inner sleeve 198 prevents the passage of oil from the supply 59 through the conduits 201 (Figure 11); and the sleeve valve 51, proper, blocks the passage of oil from the supply 60 through the conduits 202 (Figure 13). Moreover, oil in the cylinders 79 is free to drain to the sump through the conduits 184 which are not completely covered by the outer auxiliary sleeve 197 (Figure 11); and from cylinders 80 through conduits 186 and the grooves 187 and 194 to relief conduit 188 (Figure 15). The clutches 40 and 50 are then disengaged by the springs 94.

Under these circumstances, as shown in Figure 4, rotation of the crankshaft 16 is imparted to the impeller housing 18 and thence by hydraulic reaction to the runner 23 and through the overrunning clutch 25 to the main shaft 29. The sun pinion 102 drives the planet pinion 105, obtaining the maximum speed reduction and transmitting the torque to the driven shaft 64 through the sun pinion 103 engaging the corresponding planet pinion 106. The forward speed brake 119 is engaged through the manual control activating the overrunning clutch 116 to prevent reverse rotation of the planet carrier 99. The clutch carrier 52 has its sun pinion 101 constantly meshed with the corresponding planet pinion 104 and is rotated accordingly. However, both clutches 40 and 50 are disengaged and there is no reaction. Under these conditions, the maximum engine torque is transmitted to the driven shaft in the forward direction and at the lowest speed ratio.

REVERSE

*Figures 3, 5, 11, 13 and 15*

In the reverse operation, the condition of the control mechanism is precisely the same as that for first speed forward. However, while—as described below—first speed operation automatically changes to second speed operation, as the vehicle speed increases through the hydraulic control; increased reverse speeds have no such effect, as the pump which furnishes the oil to operate the hydraulic control is only operated when the vehicle moves forwardly. It will be recalled that manual operation is necessary to select forward or reverse speeds through the medium of selective brake engagement. Thus, in Figure 5, the drive is again taken from the crankshaft 16 through the impeller 18 and by reaction on the runner 23 and thence through the overrunning clutch 25 to the main shaft 29. As before, the sun pinion 102 drives the planet pinion 105 and, of course, the other planet pinions 104 and 106 are also rotated. However, the forward speed brake 119 is now released so that the carrier 99 is free of the restraint of the overrunning clutch 116. The reverse brake 96 is engaged and this locks the clutch carrier 52 and its sun pinion 101. The gearing now functions as a planetary and reverse rotation at the low-speed ratio and maximum torque is imparted to the driven shaft 64 through the planet pinion 106 and the sun pinion 103.

SECOND SPEED

*Figures 6, 7, 12, 13 and 15*

It was noted under the description of first speed operation, that the clutch carrier 52 was rotated, but that its rotational speed was not sufficient to cause radial displacement of the centrifugal weights 178 and consequent axial displacement of the sleeve valve 51 against the resistance of the primary spring 57. However, as the rotational speed increases, the weights move outwardly and the sleeve valve 51 is projected axially forward until it reaches the position shown in Figure 6. The exact speed at which this occurs is, of course, a function of the weight and the spring loading. When this position is reached, the second speed clutch 40 is engaged by oil flowing from second clutch supply 59 through the conduits 201, 192 and 184 to the second speed clutch cylinders 79 (Figure 12) and projecting the pistons 86 forwardly operating the ring 89 to engage the discs 47 and 93. The third speed clutch 50 remains inactive and the control mechanism is functionally unchanged from that shown in Figures 3, 13 and 15.

In operation, as shown in Figure 7, this locks crankshaft 16, the impeller housing 18 and the associated drum 46 directly to the clutch carrier 52. This, in turn, drives its sun pinion 101 and the triple planetary pinion through 104. The drive is again taken off through the planet pinion 106 and its sun pinion 103 on the driven shaft 64. The forward speed brake 119 is still engaged preventing the reverse rotation of the planet carrier 99 so that forward rotation at an intermediate speed ratio is imparted to the driven shaft. The main driving shaft 29, is, of course, rotated through the pinions 102 and 105, but the overrunning clutch 25 disassociates the runner 23 and permits it free rotation. The drive is entirely mechanical and the fluid coupling is inoperative.

THIRD SPEED

*Figures 8, 9, 12, 14 and 15*

As the rotational speed of the clutch carrier 52 increases, the centrifugal weights 178 will undergo further radial displacement and, in consequence, the sleeve valve 51 will be projected further toward the left against the combined resistance of the primary and secondary springs 57 and 58 until it occupies the position shown in Figure 8. The use of the separate springs permits a sharper differentiation between the two speed ranges and gives a sharper action. As a matter of illustration, the primary spring 57 is deflected through its initial range by a load of about 10 pounds and the secondary spring 58 through its range by a load of about 25 pounds. Employing these ratios, a proper balance is obtained between the third and second speed ranges and a sufficiently positive action is obtained either with increasing or decreasing speeds with and without sacrifice of smoothness. While multicoil springs are shown, it is quite possible—and under some conditions advantageous—to use single coil springs in their place. These load up much more quickly as they approach ultimate deflection and give an even sharper division between the second and third speed ranges.

Figure 12:
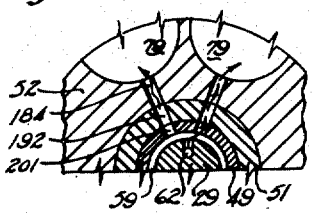
Figure 14:
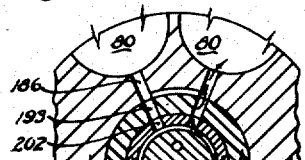
Figure 16:
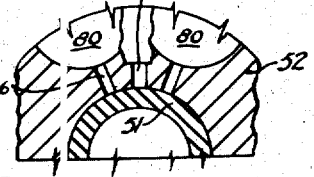

Under these conditions, oil under pressure is still supplied to the second speed clutch 40 precisely in the manner described with reference to second speed operation, the flared ends 185 and 203 permitting the continued flow of oil despite the further movement of the sleeve valve 51 (Figure 12). In addition, oil is admitted from the third speed clutch supply 60 through the conduits 202, 191, and 186 to the clutch operating cylinders 80 (Figure 14) forcing the pistons 86 rearwardly and operating the third speed clutch ring 90. At the same time the relief conduits 188 are sealed off by the sleeve valve 51 (Figure 16). The longitudinal oil grooves 194 are sufficiently displaced from the conduit 188 that oil from the second speed clutch 40 cannot flow out through them nor can oil be admitted from the third speed side. The balance between the discharge rates of the bleed 174 in the accelerating valve and the orifice 195 normally keeps the transmission in third speed even when the speed momentarily falls somewhat below the usual operating speed, since the oil passing through the orifice 195 prevents immediate responsive movement of the sleeve valve 51. However, this is overruled by the further loss in third speed clutch line pressure by leakage through the bleed 174 when the engine approaches idling conditions. The precise capacities of these orifices is a matter of experiment to obtain the requisite balance, but they are important in maintaining the requisite smoothness of operation under all conditions.

Referring now to Figure 9, power is transmitted as shown directly from the crankshaft 16 through the impeller housing 18 and the drum 46 to the clutch carrier 52. As both clutches 40 and 50 are engaged, this occasions rotation of both the planet carrier 99 and the sun pinion 101. This results in a locking of the triple pinion and the carrier, and the direct drive is taken off through the planet pinion 106 and sun pinion 103, and thence to the driven shaft 64. Again, the main drive shaft 29 is rotated, but this does not drag the hydraulic coupling, as the overrunning clutch 25 permits its free operation. The drive is entirely mechanical and the fluid coupling is not utilized. As before, the forward speed brake 119 is energized, but this has no effect since there is no reaction to overcome while the planet carrier is locked with respect to the triple planet gear. The torque is now transmitted at engine speed in the forward sense.

NEUTRAL

Figures 1, 2 and 2A

For neutral, both brakes 119 and 96 are released. No specific drawing indicates this condition, but it will be understood that the neutral notch 144 of the ratchet 136 is then engaged by the selector 142 and the cams 134 and 135 have displaced the arms 146 and 138 to the right and left, respectively. Under these conditions, theoretically, no torque is applied to the shaft 64. However, as in many transmissions of this type utilizing a fluid coupling, there is actually a tendency to creep which can be very troublesome unless proper provision is made for it. Usually, the emergency brake of the vehicle is relied upon under such circumstances, but this requires specific operation by the driver and, hence, is not entirely safe. This may be prevented automatically by the anticreep brake shown in Figures 1 and 2 and effectve between the clutch carrier 52 and the planet carrier 99. This includes a brake band 205 having an inner braking surface 206 co-operating with a complementary surface 207 on the planet carrier 99. The band 205 is cut away at 208 to increase its flexibility, leaving segments 209 which serve as additional masses responsive to centrifugal forces imposed by rotation of the carrier 52 on which the band is mounted in an extension 212. The band 205 is split at 213 and one end is loosely pinned to the clutch carrier 52 at 214. The spring 215 mounted on the boss 211 on the abutment 216 secured to the carrier 52 normally urges the band 205 into wrapping engagement with the surface 207 on the planet carrier 99. This is effective at the lower rotational speeds of the coupling obtaining during idling to impede relative rotation of the two carriers and prevent creep. However, at higher speeds, centrifugal force acting on the segments of the band 205 overcome the resistance of the spring 215, the band 205 moves outwardly and the surface 206 and 207 are disengaged. Normal relative operation of the two carriers may then continue.

The principal points to be noted in the operation of the device are that both second and third speeds are accomplished mechanically—that is, without depending upon the hydraulic coupling. On the other hand, the torque conversion in first and reverse speeds is effected through the hydraulic coupling when smoothness of transition has particular importance and where the efficiency is not of such great moment since the vehicle operates for only a short period of time in these speed ranges. Moreover, the construction is such that the fluid coupling presents no drag on the operation of the device in second and third speeds. Another point is that by having individual sources of supply to the second and third speed clutches, it is possible to maintain the second speed clutch in engagement even at speeds above the normal second speed range, when the third speed clutch is effective as well. It has been noted above that at higher speeds the centrifugal force, acting upon the oil behind the pistons by reason of the rotation of the clutch carrier, keep both clutches engaged. Moreover, when it is desired to obtain immediate acceleration beyond that afforded by third speed ratio, even though the vehicle is then proceeding in third speed, the fact that the oil pressure is constantly maintained in the second speed clutch permits an immediate transition to that speed with a consequent increase in torque to obtain the desired acceleration. Further, while the vehicle speed decreases, it is not necessary to re-engage the second speed clutch since it remains in engagement at all speeds above those obtaining for first. A further point to be observed is that by cushioning the operation of the sleeve valve, the transition downwardly to idling speed is made more smoothly. Adequate automatic prevention of creep is secured. Still another factor is that by locking out the reverse brake through hydraulic pressure, chance engagement of the manual control in the reverse position is precluded so long as the vehicle is proceeding forwardly.

It will be understood that the term "fluid coupling" as used in the specification and claims is to be interpreted as meaning a fluid power transmitting device of the two element hydro-kinetic type utilized to transmit power between drive and driven members of the transmission.

Some changes may be made in the arrangement, construction, and combination of the various parts of the improved device, without departing from the spirit of the invention and it is the intention to cover by the claims, such changes as may reasonably be included within the scope thereof.

The invention claimed is:

1. In a variable speed power transmission, in combination, a power shaft and a load shaft and a main shaft axially arranged, a fluid coupling comprising a power receiving element fixed for rotation with said power shaft and a power delivery element having a one-way driving connection with said main shaft, a planetary gearing system including planet pinion gears mounted on a planet carrier rotatably supported about the axis of said shafts and respectively meshing sun gears, selectively operable torque reaction means associated with said planet carrier for obstructing rotational movement of said planet carrier in one direction, an intermediate rotatable power transmitting member including one of said sun gears, a second sun gear on said main shaft, a third sun gear on said load shaft, manually operable means to secure said power transmitting member against rotation, first clutch means to fix said power transmitting member for rotation with said power shaft, a second clutch, means connecting said second clutch to said power transmitting member, means also connecting said second clutch to said planet carrier, and means for operating said second clutch means only concurrently with said first clutch means.

2. In a variable speed power transmission, in combination, a power shaft and a main shaft and a load shaft axially arranged, a fluid coupling comprising a power receiving element fixed for rotation with said power shaft and a power delivery element having a one-way driving connection with said main shaft, a planetary gearing system including planet pinion gears mounted on a planet carrier rotatably supported about the axis of said shafts and respectively meshing sun gears, selectively operable torque reaction means associated with said planet carrier for obstructing rotational movement of said planet carrier in one direction, an intermediate rotatable power transmitting member including one of said sun gears, a second sun gear on said main shaft, a third sun gear on said load shaft, manually operable means to secure said power transmitting member against rotation, first clutch means to fix said power transmitting member for rotation with said power shaft, a second clutch, means connecting said second clutch to said power transmitting member, means also connecting said second clutch to said planet carrier, and means for operating said second clutch means only concurrently with said first clutch means.

3. In a variable speed power transmission, in combination, a power shaft and a main shaft and a load shaft axially arranged, a fluid coupling comprising a power receiving element fixed for rotation with said power shaft and a power delivery element having a one-way driving connection with said main shaft, a planetary gearing system including planet pinion gears mounted on a planet carrier rotatably supported about the axis of said shafts and respectively meshing sun gears, selectively operable torque reaction means associated with said planet carrier for obstructing rotation of said planet carrier in one direction only, an intermediate rotatable power transmitting member including one of said sun gears, a second sun gear on said main shaft, a third sun gear on said load shaft, manually selectively operable manual means to secure said power transmitting member against rotation or to operate said torque reaction means or to hold both said securing means and said reaction means inoperative, first clutch means to fix said power transmitting member for rotation with said power shaft, a second clutch, means connecting said second clutch to said power transmitting member, means also connecting said second clutch to said planet carrier, and means for operating said second clutch means only concurrently with said first clutch means.

4. In a variable speed power transmission, in combination, a power shaft and a main shaft and a load shaft axially arranged, a fluid coupling comprising a power receiving element fixed for rotation with said power shaft and a power delivery element having a one-way driving connection with said main shaft, a planetary gearing system including planet pinion gears fixed for common rotation and mounted on a planet carrier rotatably supported about the axis of said shaft and respectively meshing sun gears, selectively operable torque reaction means associated with said planet carrier for obstructing rotation of said planet carrier in one direction only, an intermediate rotatable power transmitting member including one of said sun gears, a second sun gear on said main shaft, a third sun gear on said load shaft, manually operable selective means effective to secure said power transmitting member against rotation or to operate said torque reaction means or to hold both said securing means and said reaction means inoperative, first clutch means carried on said power transmitting member to fix said power transmitting member for rotation with said power shaft, second clutch means mounted on said power transmitting member, means connecting said second clutch to said planet carrier, means for operating said second clutch means only concurrently with said first clutch means, hydraulic actuating means for said clutches, a valve controlling said hydraulic actuating means, a governor operating said valve to actuate said first clutch above a predetermined load shaft speed and to actuate both said clutches above a predetermined higher load shaft speed:

5. In a variable speed power transmission, in combination, a housing, a power shaft and a main shaft and a load shaft axially arranged, a fluid coupling comprising a power receiving element fixed for rotation with said power shaft and a power delivery element having a one-way driving connection with said main shaft, a planetary gearing system including planet pinion gears fixed for common rotation and mounted on a planet carrier rotatably supported about the axis of said shafts and respective meshing sun gears, selectively operable torque reaction means effective between said housing and said planet carrier for obstructing rotation of said planet carrier in one direction only, an intermediate rotatable power transmitting member including one of said sun gears, a second sun gear on said main shaft, a third sun gear on said load shaft, selectively operable means on said housing to secure said power transmitting member against rotation, externally operable means effective to actuate said torque reaction means or said power transmitting member securing means or to render both said last-named means inoperative, first clutch means mounted on said power transmitting member and selectively operable to fix said power transmitting member for rotation with said power shaft, second clutch means mounted on said power transmitting means, means connecting said second clutch to said planet carrier, said second clutch means being operable only concurrently with said first clutch means, hydraulic actuating means for said clutches, a valve controlling said hydraulic actuating means, a governor operating said valve to engage said first clutch above a predetermined load shaft speed and to engage said second clutch above a predetermined higher load shaft speed, and externally operable means to overrule said governor to restrain operation of said clutch above said predetermined higher load shaft speed.

6. In a variable speed power transmission, in combination, a housing, a power shaft and a main shaft and a load shaft axially arranged in said housing, a fluid coupling comprising a power receiving element fixed for rotation with said power shaft and a power delivery element having a one-way driving connection with said main shaft, a planetary gearing system including triple planet pinion gears fixed for common rotation and mounted on a planet carrier rotatably supported about the axis of said shaft and respectively meshing sun gears, selectively operable torque reaction means effective between said housing and said planet carrier for obstructing rotation of said planet carrier in one direction only, an intermediate rotatable power transmitting member including one of said sun gears, a second sun gear on said main shaft, a third sun gear on said load shaft, means on said housing to secure said power transmitting member against rotation, externally controllable selectively operable means effective to activate said torque reaction means or said power transmitting member securing means or to render both said last-named means inoperative, first clutch means mounted on said power transmitting member and selectively operable to fix said power transmitting member for rotation with said power shaft and said power receiving element, a second clutch, means connecting said second clutch to said power transmitting member, means also connecting said second clutch to said planet carrier, said second clutch means being operable only concurrently with said first clutch means, hydraulic actuating means for said clutches, a valve controlling said hydraulic actuating means, a governor operating said valve to engage said first clutch above a predetermined load shaft speed and to engage both said clutches above a predetermined higher load shaft speed, externally operable means to overrule said governor to restrain the operation of said second clutch above said predetermined higher load shaft speed, and manually operable hydraulic means for releasing said second clutch.

7. In a variable speed transmission, in combination, a housing, a power shaft, a load shaft, a fluid coupling having one element fixed for rotation with said power shaft, a multiple planetary gearing system having one element fixed for rotation with said load shaft, a power transmitting member interposed between said fluid coupling and said planetary gearing system and arranged for selective operation therewith, means rendering said member inoperative with respect to said fluid coupling and said planetary gearing system and to transmit torque in one direction through said coupling and said planetary gearing system at one speed ratio, means locking said member to said housing, means to lock said member to said power shaft and said planetary gearing to effect differential rotation thereof and transmit torque at another speed ratio in said one direction, a clutch, means connecting said clutch to said power transmitting member, means also connecting said clutch to a second element of said planetary gearing system, means applying said clutch to lock said member to said power shaft and said planetary gearing system to effect common rotation thereof and transmit torque at a third speed ratio in said one direction, and means rendering said fluid coupling inoperative while torque is transmitted at said last two speed ratios.

8. In a variable speed transmission, in combination, a housing, a power shaft, a load shaft, a fluid coupling having one element fixed for rotation with said power shaft, a multiple planetary gearing system having one element thereof fixed for rotation with said load shaft, a power transmitting member interposed between said fluid coupling and said planetary gearing system and arranged for selective operation therewith, means rendering said member inoperative with respect to said fluid coupling and said planetary gearing system and to transmit torque in one direction through said coupling and said planetary gearing system at one speed ratio, means locking said member to said housing, means to lock said member to said power shaft and said planetary gearing and to effect differential rotation thereof and transmit torque at another speed ratio in said one direction, a clutch, means connecting said clutch to said power transmitting member, means also connecting said clutch to a second element of said planetary gearing system, means applying said clutch to lock said member to said power shaft and said planetary gearing system and to effect common rotation thereof and transmit torque at a third speed ratio in said one direction, means rendering said fluid coupling inoperative while torque is transmitted at said last two speed ratios, said member including control means automatically responsive to the rotational speed of said member to operate said last two locking means.

9. In a variable speed transmission, in combination, a housing, a power shaft, a load shaft, a fluid coupling having one element fixed for rotation with said power shaft, a multiple planetary gearing system having one element thereof fixed for rotation with said load shaft, a power transmitting member interposed between said fluid coupling and said planetary gearing system and arranged for selective operation therewith, means rendering said member inoperative with respect to said fluid coupling and said planetary gearing system and to transmit torque in one direction through said coupling and said planetary gearing system at one speed ratio, means locking said member to said housing, means to lock said member to said power shaft and said planetary gearing to effect differential rotation thereof and to transmit torque at another speed ratio in said one direction, means to lock said member to said power shaft and said planetary gearing system to effect common rotation thereof and transmit torque at a third speed ratio in said one direction, means rendering said fluid coupling inoperative while torque is transmitted at said last two speed ratios, said last two locking means comprising hydraulically activated clutches carried on said member, conduits leading to said clutches, a series of hydraulic valves in said conduits, a device on said member responsive to the rotational speed thereof and effective to operate said valves, a pump driven by said load shaft to deliver fluid under pressure to effect respective operation of said clutches, and means limiting the operation of said valves to permit the application of one said clutch at a predetermined load shaft speed range and of both said clutches at a higher predetermined load shaft speed range.

10. In a variable speed transmission, in combination, a housing, a sump, a power shaft, a load shaft, a fluid coupling having one element fixed for rotation with said power shaft, a multiple planetary gearing system comprising a carrier and planet pinions and sun pinions having one element thereof fixed for rotation with said load shaft, a power transmitting member interposed between said fluid coupling and said planetary gearing system and arranged for selective operation therewith, means rendering said member inoperative with respect to said fluid coupling and said planetary gearing system and to transmit torque in one direction through said coupling and said planetary gearing system at one speed ratio.

means locking said member to said housing, means to lock said member to said power shaft and said planetary gearing system to effect differential rotation thereof and transmit torque at another speed ratio in said one direction, a clutch, means connecting said clutch to said power transmitting member, means also connecting said clutch to said carrier, means applying said clutch to lock said member to said power shaft and said planetary gearing system to effect common rotation thereof and transmit torque at a third speed ratio in said one direction, and means rendering said fluid coupling inoperative while torque is transmitted at said last two speed ratios.

11. The structure of claim 10 which is further characterized in that said last two locking means comprise clutches on said member co-operating with said power shaft and the carrier of said planetary gearing system respectively, hydraulically activated operating cylinders for said clutches, conduits leading to said cylinders, a series of valves in said conduits controlling the flow therethrough, a device on said carrier responsive to the rotational speed thereof controlling said valves, and a pump driven by said load shaft supplying activating fluid under pressure to said conduits.

12. The structure of claim 10 which is further characterized in that said last two locking means comprise clutches co-operating with said power shaft and the carrier of said planetary gearing system respectively, hydraulically activated operating cylinders for each of said clutches, conduits leading to said cylinders a series of valves in said conduits controlling the hydraulic flow therethrough, a device on said carrier responsive to the rotational speed thereof controlling said valves, a pump driven by said load shaft supplying activating fluid under pressure independently to said conduits, and an accelerator controlled valve selectively operable to interrupt the flow of such fluid to one of said conduits.

13. The structure of claim 10 which is further characterized in that said last two locking means comprise clutches on said member co-operating with said power shaft and the carrier of said planetary gearing system respectively, hydraulically activated operating cylinders for said clutches, conduits leading to said cylinders, a slidable sleeve valve interposed in said conduits controlling the flow therethrough, a device on said carrier responsive to the rotational speed thereof and effective to move said sleeve valve axially, a pump driven by said load shaft supplying activating fluid under pressure independently to said conduits, a first spring means resiliently resisting the movement of said sleeve valve in response to said device through an initial predetermined range, a second spring means resiliently resisting the further movement of said sleeve valve in response to said device through a second predetermined range, said sleeve valve being so arranged that said conduits to one said clutch are opened at the end of said first range and that said conduits to the other said clutch are also opened at the end of said second range.

14. The structure of claim 10 which is further characterized in that said last two locking means comprise clutches on said member co-operating with said power shaft and the carrier of said planetary gearing system respectively, hydraulically activated operating cylinders for said clutches, conduits leading to said cylinders, a slidable sleeve valve interposed in said conduits controlling the flow therethrough, a device on said carrier responsive to the rotational speed thereof effective to move said sleeve valve axially, a pump driven by said load shaft supplying activating fluid under pressure independently to said conduits, a first spring means resiliently resisting the axial movement of said sleeve valve in response to said device from an initial position in which said conduits are closed to an intermediate position in which fluid is admitted to one said cylinder, a second spring means resiliently resisting further axial movement of said sleeve valve from said intermediate position to a final position in which fluid is admitted to the other said cylinder, said one cylinder being continuously activated after said sleeve valve passes said intermediate position.

15. The structure of claim 10 which is further characterized in that said last two locking means comprise clutches on said member co-operating with said power shaft and the carrier of said planetary gearing system respectively, hydraulically activated operating cylinders for each of said clutches, conduits leading to said cylinders, a sleeve valve effective on axial movement to control the flow through said conduits, a device on said carrier responsive to the rotational speed thereof effective to move said sleeve valve axially, a pump driven by said load shaft supplying activating fluid under pressure independently to said conduits, a first spring means resiliently resisting the axial movement of said sleeve valve in response to said device from an initial position in which said conduits are closed to an intermediate position in which fluid is admitted to one said cylinder, a second spring means resiliently resisting further axial movement of said sleeve valve from said intermediate position to a final position in which fluid is admitted to the other said cylinder, said valve having passageways communicating with said conduits as the rotational speed of said carrier decreases and said sleeve valve is returned to its initial position under the urging of said spring means and simultaneously communicating with the sump to drain oil from said cylinders.

16. The structure of claim 10 which is further characterized in that said last two locking means comprise clutches on said member co-operating with said power shaft and the carrier of said planetary gearing system respectively, hydraulically activated operating cylinders for each of said clutches, conduits leading to said cylinders, a sleeve valve effective on axial movement to control the flow through said conduits, a device on said carrier responsive to the rotational speed thereof effective to move said sleeve valve axially, a pump driven by said load shaft supplying fluid under pressure independently to said conduits, a first spring means resisting the axial movement of said sleeve valve in response to said device from an initial position in which said conduits are closed to an intermediate position in which fluid is admitted to one said cylinder, a second spring means increasingly resisting further axial movement of said sleeve valve from said intermediate position to a final position in which fluid is admitted to the other said cylinder, said valve having passageways communicating inversely successively with said conduits, as the rotational speed of said carrier decreases and said sleeve valve is returned to its initial position under the urging of said spring means and simultaneously communicating with the sump to drain oil from said cylinder.

17. The structure of claim 10 which is further characterized in that said last two locking means comprise clutches on said member co-operating with said power shaft and the carrier of said planetary gearing system respectively, hydraulically activated operating cylinders for said clutches, conduits leading to said cylinders, a sleeve valve interposed in said conduits controlling the flow therethrough, a device on said carrier responsive to the rotational speed thereof adapted to move said sleeve valve axially as the speed increases, a pump driven by said load shaft supplying fluid under pressure independently to said conduits, a first spring means resiliently resisting the axial movement of said sleeve valve in response to said device from an initial position in which said conduits are closed to an intermediate position in which fluid is admitted to one said cylinder, a second spring means resiliently resisting further axial movement of said sleeve valve from said intermediate position to a final position in which fluid is admitted to the other said cylinder, and hydraulic means initially resisting the return of said sleeve valve from said final position when rotational speed of said carrier decreases.

18. A structure of claim 10 which is further characterized in that said last two locking means comprise clutches co-operating with said power shaft and the carrier of said planetary gearing system respectively, hydraulically activated operating cylinders for said clutches, conduits leading to said cylinders, a sleeve valve interposed in said conduits and effective to control the flow therethrough, a device on said carrier responsive to the rotational speed thereof and adapted to move said sleeve valve into successive positions of co-operation with said conduits, a pump driven by said load shaft supplying activating fluid under pressure independently to said conduits, a first spring means resiliently resisting the movement of said sleeve valve in response to increased speed of the carrier from an initial position in which said conduits are closed to an intermediate position in which fluid is admitted to one said cylinder, a second spring means resiliently resisting further movement of said sleeve valve from said intermediate position to a final position in which fluid is admitted to other said cylinder, and externally operated overriding means effective at said pump to interrupt the flow of fluid to the other said cylinder.

19. In the structure of claim 10 which is further characterized in that said control means comprise a pump driven by said load shaft and supplying activating fluid under pressure to operate certain of said locking means, and said locking means effective between said member and said housing includes a cylinder supplied with fluid from said pump and effective to restrain the engagement of said locking means so long as said load shaft is operating in said one direction.

20. The structure of claim 10 which is further characterized in that said planetary gearing system includes a planet carrier, a centrifugally operated brake carried by said member and adapted to co-operate with said carrier to restrain relative rotation therebetween at idling speeds and to be disengaged therefrom as the rotational speed of said carrier increases.

EUGENE J. FARKAS.

REFERENCES CITED

The following references are of record in the file of this patent:

UNITED STATES PATENTS

| Number | Name | Date |
|---|---|---|
| 2,103,540 | Livermore | Dec. 28, 1937 |
| 2,303,975 | Banker | Dec. 1, 1942 |
| 2,329,724 | Maurer | Sept. 21, 1943 |
| 2,332,593 | Nutt | Oct. 26, 1943 |
| 2,339,626 | Duffield | Jan. 18, 1944 |
| 2,343,955 | Cotterman | Mar. 14, 1944 |
| 2,371,574 | Swennes | Mar. 13, 1945 |
| 2,377,696 | Kelley | June 5, 1945 |